No. 769,288. Patented September 6, 1904.

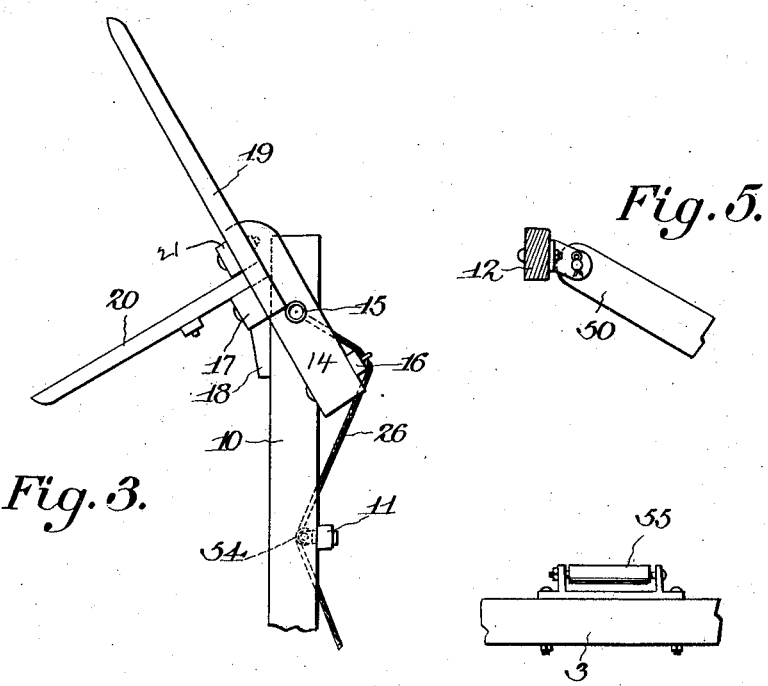
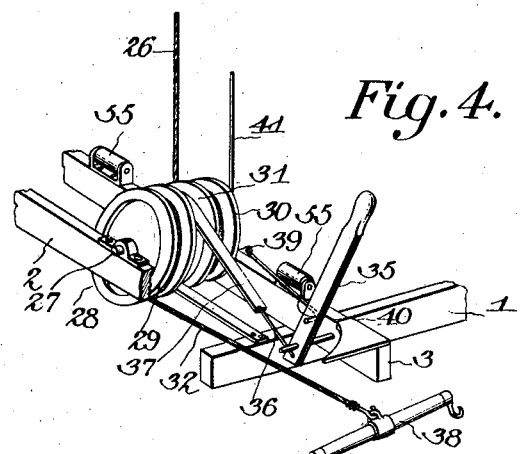

UNITED STATES PATENT OFFICE.

MARION ADDY, OF BARTONVILLE, ILLINOIS, ASSIGNOR OF ONE-HALF TO CHARLES ADDY, OF MAPLETON, ILLINOIS.

HAY-STACKER.

SPECIFICATION forming part of Letters Patent No. 769,288, dated September 6, 1904.

Application filed October 26, 1903. Serial No. 178,662. (No model.)

*To all whom it may concern:*

Be it known that I, MARION ADDY, a citizen of the United States, and a resident of Bartonville, in the county of Peoria and State of Illinois, have invented Improvements in Hay-Stackers, of which the following is a specification.

This invention relates to hay-stackers, and it has for its object to provide a machine of this class which shall be simple in construction, durable, easily manipulated, and thoroughly efficient for the purpose of elevating the loads of hay and depositing the same upon a stack.

A further object of the invention is to so construct the device that a base-frame of comparatively small size may be utilized, while at the same time the load may be raised to elevate it to a considerable height.

With these ends in view the invention consists in the improved construction, arrangement, and combination of parts which will be hereinafter fully described, and particularly pointed out in the claims.

In the accompanying drawings has been illustrated a simple and preferred form of the invention, it being understood, however, that changes and modifications may be made within the scope of the invention and especially with regard to the size, proportion, and exact manner of assemblage without departing from the spirit of the invention or sacrificing the utility of the same.

Figure 1:
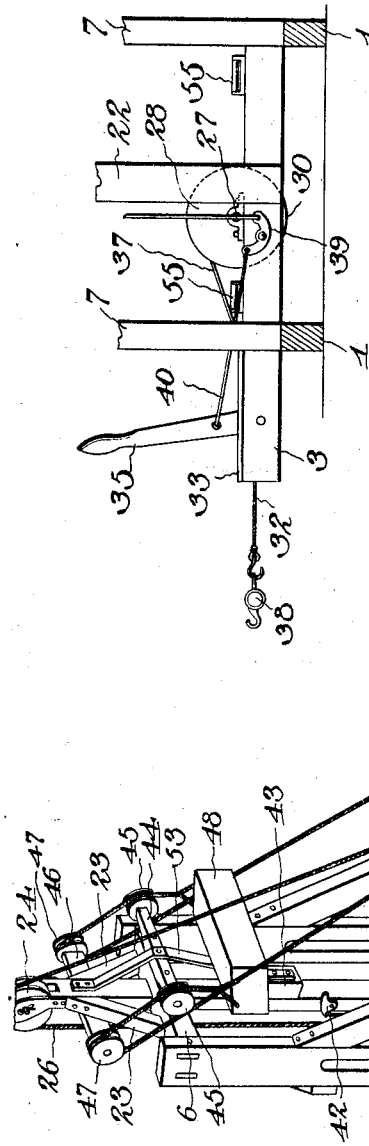
Figure 2:
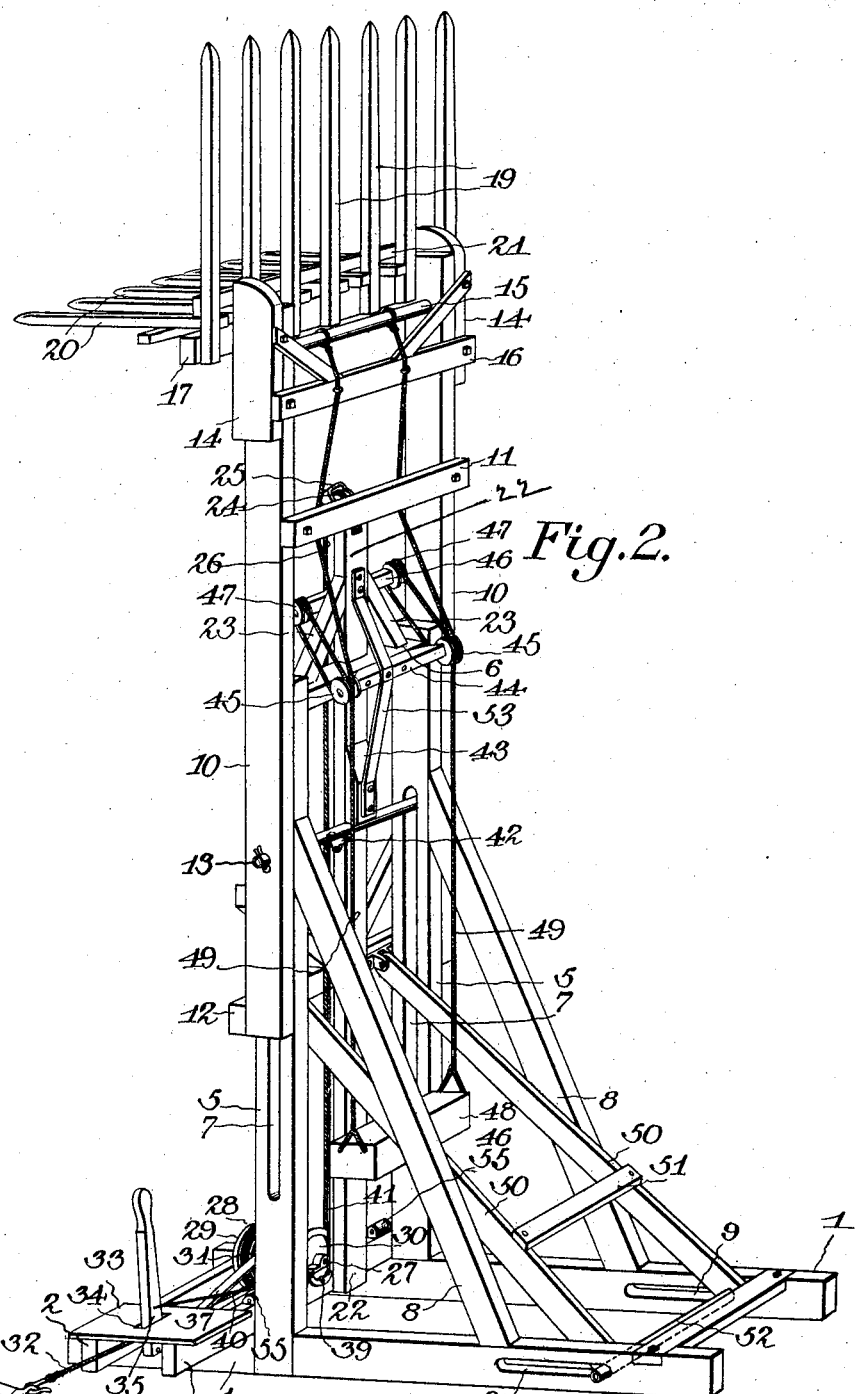

In said drawings, Figure 1 is a perspective view showing the improved hay-stacker in position for receiving a load. Fig. 2 is a perspective view showing the hay-stacker with the carrier in an elevated position. Fig. 3 is a detail view of the free end of the carrier-frame, showing the carrier-head in tilted position. Fig. 4 is a perspective detail view of the hoisting and lowering mechanism. Fig. 5 is a detail view showing the hinge connection of the tilting frame with the carrier-frame. Fig. 6 is a detail view of one of the rope-guiding rollers. Fig. 7 is a detail view taken transversely through the sills and looking in the direction of the uprights 5 and the cross-pieces supporting the drum or winding-reel.

Corresponding parts in the several figures are indicated by similar numerals of reference.

The base-frame of the machine is composed of a pair of side pieces 1 1, which are connected near their rear ends by a pair of cross-pieces 2 3, supported edgewise upon the side pieces. The front ends of the latter are connected by a cross-piece, which is mortised into the said side pieces. The latter support a pair of uprights 5 5, the lower ends of which are framed into the side pieces 1 1, closely adjacent to the cross-piece 3, the upper ends of said uprights being connected by a cap-piece 6, the ends of which are mortised into the said uprights. The latter are each provided with a vertical transverse slot 7. Inclined braces 8 8 connect the uprights 5 with the side pieces of the base-frame, and the latter are provided near their front ends with horizontally-disposed transverse slots 9.

The main carrier-frame is composed of side pieces 10 10, which are connected near their free ends by a cross-piece 11 and near their inner ends by a cross-piece 12. When I refer to the "inner" ends of the carrier-frame, I mean the end which is connected, as will be presently described, with the uprights 5 of the supporting-frame. When I refer to the "under side" of the carrier-frame, I have in mind the position of the frame when ready to receive a load, as shown in Fig. 1 of the drawings, the cross-piece 11 being secured to the under sides of the arms or side pieces 10 of the carrier-frame near the free end of said arms, while the cross-piece 12 is secured to the upper sides of said side pieces to connect and to space the latter suitably apart.

The side pieces 10 of the carrier-frame are connected with each other and with the uprights of the supporting-frame by means of a shaft 13, which may be tubular, consisting of a heavy gas-pipe or other suitable wrought-iron pipe, said shaft extending through the slots 7 in the uprights 5, with which the carrier-frame is thus slidably and pivotally connected.

Pivotally connected with the free end of the carrier-frame is the carrier-head, which comprises a pair of blocks or side pieces 14, mounted adjacent to the outer sides of the side pieces 10 upon the ends of a transverse tubular shaft 15. The inner ends of the side pieces 14 are connected by a cross-piece 16, which extends underneath the side pieces of the carrier-frame. A cross-bar 17 connects the side pieces or blocks 14 above the carrier-frame. Suitably secured to the side pieces 10 of the latter are a pair of beveled blocks 18, which serve as stops when the carrier-head is tilted rearwardly, as shown in Fig. 3 of the drawings. The said carrier-head includes the longitudinal teeth 19, which are bolted to the under side of the cross-bar 17, and the upright teeth, which may be bolted to the teeth 19 and to the front side of the cross-bar 17, a reinforcing-bar 21 being secured to the teeth 19 in front of the lower ends of the teeth 20.

It will be observed that by the construction and arrangement of the carrier-head which has been just described the cross-bars 16 and 17 will prevent the head from swinging downwardly beyond the proper limit and will retain said carrier-head in position while a load is being elevated, while the blocks 18 serve as stops to prevent excessive movement of the carrier-head in the opposite direction, as in the act of tilting, while the load is being discharged upon the stack.

22 designates an upright which is disposed intermediately between the uprights 5 of the main supporting-frame and the lower end of which is bolted securely to the cross-piece 3, while said upright, which extends above the cap-piece 6, is mortised into and strongly connected with the latter. Braces 23 also connect the said upright with the cap-piece 6. This upright carries at its upper end a pulley 24, having a guard or cap 25, which serves to retain in position a hoisting-rope 26, one end of which is made fast to the upper side of the cross-piece 11 of the carrier-frame, while the other end, after passing over the pulley 24, extends downwardly and is secured to a drum or winding-reel which is mounted in suitable bearings upon the cross-pieces 2 and 3, between which the said reel is accommodated. This drum or reel comprises a shaft 27, upon which is mounted a cylinder 28, having end flanges 29 and 30 and a centrally-disposed band-wheel 31, whereby the reel is divided into two separate compartments. The hoisting-rope 26 is connected with the part of the drum adjacent to the flange 30, and the draft-rope 32 is connected with the part of the drum adjacent to the flange 29 and is wound in the opposite direction to the hoisting-rope. Hence when draft is applied to the rope 32, whereby it is unwound from the drum, the latter is rotated and the hoisting-rope 26 is wound thereon, as will be readily understood. The cross-pieces 2 and 3 are extended at one side of the base-frame and serve to support a platform 33, having a slot 34, in which is pivoted a hand-lever 35, the lower end of which is connected by a hooked rod 36 with a steel strap 37, which passes over the wheel or friction-pulley 31 and has its opposite end made fast to a suitable point of attachment, such as one of the base-beams 1. Means for applying draft, such as a whiffletree 38, is connected with the end of the draft-rope.

Pivotally connected with the front side of the cross-piece 3 is a bell-crank lever 39, one arm of which is connected by a rod 40 with the hand-lever 35 above the fulcrum of the latter. The other arm of the bell-crank 29 is connected by a rod 41 with one arm of a T-shaped latch 42, which is pivotally connected with one side of the upright 22. Suitably attached to the front side of the latter a short distance above the latch 42 is a stop-block 43.

Suitably bolted to the front side of the cap 6 is a cross-bar 44, at the ends of which are journaled a pair of guide-pulleys 45. A similar cross-bar 46, connected with the upright 22 near the upper end of the latter, is provided at the ends thereof with guide-pulleys 47, which are in alinement with the guide-pulleys 45.

48 designates a weight or a box adapted to contain weights sufficient to counterbalance the weight of the carrier-frame. This weight-box is attached at its ends to a pair of ropes 49, which pass over the guide-pulleys 45 47, and thence in a forward and downward direction to the front end of the carrier-frame when the latter is in the position shown in Fig. 1, the ends of said ropes being secured to the transverse shaft 15, which pivotally connects the carrier-frame with the carrier-head.

Hingedly connected with the under side of the cross-bar 12 at the inner end of the carrier-frame are the side pieces 50 of a frame which I designate the "tilting frame," said side pieces being connected by a cross-piece 51 and by a shaft 52, the ends of which extend into and are slidable in the slots 9 near the front end of the base-frame.

Suitably secured to the front side of the stop-block 43 is the lower end of a strap 53, which extends in front of the cross-bar 44 and the upper end of which is suitably secured to the front side of the upright 22. This strap serves to reinforce the parts connected thereby and also as a guiding means for the weight-box 48 when the latter is at the upper limit of its movement.

Upon the upper side of the cross-bar 11, in alinement with the weight-carrying ropes 49, are mounted a pair of guide-rollers 54, which engage the said weight-carrying ropes to avoid wear by friction upon the latter. Similar rollers 55 are mounted upon the cross-piece 3 to engage the side members 50 of the tilting frame.

From the foregoing description, taken in connection with the drawings hereto annexed, the operation and advantages of this invention will be readily understood by those skilled in the art to which it appertains. When the machine is in the position illustrated in Fig. 1, the load to be elevated may be deposited upon the carrier by means of an ordinary gathering-rake. When the load is in position, draft is applied to the draft-rope, which results in unwinding the same from the winding-drum upon which the hoisting-rope is simultaneously wound, thus elevating the loaded end of the frame and simultaneously causing the shaft connecting the side members of the tilting frame to move forwardly in the slots 9 near the front end of the base-frame. As the loaded end of the carrier is being elevated the shaft 13, connecting the side members of said carrier-frame, will gradually move upwardly in the slots 7 of the uprights 5, the tilting frame meanwhile serving to tilt the carrier-frame until the latter assumes its elevated and approximately vertical position. (Illustrated in Fig. 2.) When the carrier-frame reaches this position, the shaft 13 passes into engagement with the latch 42, upon which it is supported, further movement in an upward direction being checked by the stop-block 43, the location of the under side of which is slightly below the upper ends of the slots 7 of the upright 5. While the carrier-frame is thus being elevated, the weight-box 48 descends and assists in the elevating operation to the extent of counterbalancing the weight of the carrier-frame, and while the latter is being elevated the rollers 54 upon the cross-bar 11 will engage the weight-carrying ropes 49, which are thus temporarily passed around the guide-pulleys 45, as will be seen in Fig. 3 of the drawings. When the carrier-frame reaches its elevated position, the weight of the load will tilt the carrier-head to the position illustrated in Fig. 3 and the load will thus be guided in a rearward direction onto the stack which is being built. It will be observed that the frame is now sustained in an elevated position by the latch member 42. In order to release the frame and permit it to drop to its initial position, it is only necessary to manipulate the hand-lever 35 by thrusting the upper end of said lever in the direction of the winding-drum. The intermediate connecting-rods 40 and 41 and bell-crank lever 39 will thereby be operated to swing the latch member 42 from under the shaft 13, thus permitting the frame to drop, but at the same time the strap 37, which constitutes a friction-brake, will be tightened upon the band-wheel or friction-wheel 31, and the operator is thereby enabled to perfectly control the rapidity of the descent of the carrier-frame and its restoration to the initial position. (Shown in Fig. 1.)

It is to be understood that in the construction of my improved hay-stacker the parts are to be strongly braced and jointed together in any suitable manner and that bracing devices, bolts, and the like may be used whenever desired. By the construction herein described, however, a device is produced which is simple, inexpensive, and practically useful for the purposes of the invention.

Having thus described the invention, I claim—

1. In a device of the class described, a base-frame, uprights supported upon said base-frame having vertical transverse slots, a shaft vertically movable in said slots, a carrier-frame connected pivotally with said shaft and having side pieces extended in front and in rear of the uprights.

2. In a device of the class described, a base-frame, vertically-slotted uprights upon said base-frame, a shaft vertically movable in the slots of said uprights, a carrier-frame connected pivotally with said shaft, a hoisting-pulley supported intermediate of and above the slotted uprights, a hoisting-rope passing over said pulley, and having connection with the cross-bar of the carrier-frame, and a winding-drum having means for the attachment of the other end of the hoisting-rope.

3. In a device of the class described, a base-frame, an upright frame supported thereon and having vertically-slotted side pieces, a shaft movable in the slots of said side pieces, a carrier-frame pivotally connected with said shaft, a tilting frame connected hingedly with the inner end of the carrier-frame, a shaft connecting the side members of said tilting frame and extending through slots in the side pieces of the base-frame, and hoisting means.

4. In a device of the class described, a base-frame having horizontally-slotted side members, an upright frame having vertically-slotted side pieces, a shaft movable in the slots of the upright frame, a carrier-frame connected pivotally with said shaft, a cross-bar connecting the inner ends of the side pieces of the carrier-frame, a tilting frame hingedly connected with said cross-bar, a shaft connecting the side pieces of the tilting frame and engaging the horizontal slots in the base-frame, and a carrier-head at the free end of the carrier-frame.

5. In a device of the class described, a tiltable carrier-frame having a vertically-movable inner end, in combination with a tilting frame hingedly connected with said carrier-frame and having a horizontally-movable outer end.

6. In a device of the class described, a tiltable carrier-frame having a vertically-movable inner end, a tilting frame hingedly connected with said carrier-frame at the end of the same opposite to the carrier-head, said tilting frame having a horizontally-movable outer end, and hoisting means for the said carrier-frame.

7. In a device of the class described, a tiltable carrier-frame having a vertical inner end, a tiltable carrier-head at the free end of said frame, means to limit the movement of said tiltable carrier-head, a tilting frame connected hingedly with the inner end of the carrier-frame and having a longitudinally-movable outer end, and means for limiting the longitudinal movement of said tilting frame.

8. In a device of the class described, a tiltable, vertically-movable carrier-frame, and latch means to sustain said frame in an elevated position.

9. In a device of the class described, a tiltable, vertically-movable carrier-frame, latch means to sustain the latter in an elevated position, and a stop to limit the upward movement of said carrier.

10. In a device of the class described, a tiltable, vertically-movable carrier-frame, a weight to counterbalance the weight of said frame, flexible supporting means for said weight, guiding means for said flexible supporting means, a carrier-head mounted pivotally at the free end of the carrier-frame, and a shaft pivotally supporting said head, said shaft serving also for the attachment of the flexible weight-carrying means.

11. In a device of the class described, a tiltable carrier-frame, a tiltable carrier connected pivotally with the outer end of said frame, a counterweight for said frame, flexible supporting means for said counterweight connected with the pivotal connecting means of the carrier-frame and the carrier-head, and also connected with a cross-bar of the latter to normally restrain it from tilting, and guide-rollers for said flexible weight-carrying means.

12. In a device of the class described, a tiltable, vertically-movable carrier-frame, hoisting means for the same, latch means for sustaining said carrier in an elevated position, brake means to control the descent of the carrier, and means including a hand-lever, for simultaneously releasing the supporting-latch and throwing the brake means into operation.

MARION ADDY.

Witnesses:
Wm. H. Foley,
Geo. W. Hermann.